US012115109B2

(12) United States Patent
Girardin et al.

(10) Patent No.: US 12,115,109 B2
(45) Date of Patent: Oct. 15, 2024

(54) RESTRAINT SYSTEM

(71) Applicant: VALEDA COMPANY, Oakland Park, FL (US)

(72) Inventors: Patrick Girardin, Fort Lauderdale, FL (US); Paul Edward Slevinsky, Brockville (CA); Mark Easton, Chatham (GB); Gareth Holloway, Birchington (GB); Robert Andrew Cumming, Cheshire (GB)

(73) Assignee: Valeda Company, LLC, Oakland Park, FL (US)

(*) Notice: Subject to any disclaimer, the term of this patent is extended or adjusted under 35 U.S.C. 154(b) by 30 days.

(21) Appl. No.: 17/987,093

(22) Filed: Nov. 15, 2022

(65) Prior Publication Data

US 2023/0076151 A1 Mar. 9, 2023

Related U.S. Application Data

(63) Continuation of application No. 17/141,387, filed on Jan. 5, 2021, now Pat. No. 11,529,273, which is a (Continued)

(51) Int. Cl.
*A61G 3/08* (2006.01)
*A61G 1/02* (2006.01)

(52) U.S. Cl.
CPC ......... *A61G 3/0875* (2013.01); *A61G 1/0293* (2013.01); *A61G 2220/14* (2013.01)

(58) Field of Classification Search
CPC ................ A61G 3/0875; A61G 1/0293; A61G 2220/14; A61G 1/0212; A61G 1/0237; (Continued)

(56) References Cited

U.S. PATENT DOCUMENTS 4,097,941 A * 7/1978 Merkel ................ A61G 1/0231 108/147.22
5,092,722 A * 3/1992 Reazer, III ............... A61G 1/06 410/104

(Continued)

FOREIGN PATENT DOCUMENTS

KR 100694815 B1 3/2007

OTHER PUBLICATIONS

Communication dated Dec. 19, 2019 in PCT/US2019/052328.

(Continued)

*Primary Examiner* — Pinel E Romain
(74) *Attorney, Agent, or Firm* — Daniel Tallitsch

(57) ABSTRACT

The embodiments described and claimed herein are a restraint system for securing a wheeled mobility device in a vehicle. In one embodiment, at least one restraint includes a hand-releasable connection to the vehicle. In other embodiments, the hand releasable connection is formed by a set of mounting details, where the mounting details include a headed stud received in a slot. In yet other embodiments, the hand releasable connection can be formed by a spring loaded locking pin that engages with a bore. In even further embodiments, the headed stud and spring loaded locking pin are coupled to the restraint, while the slot and bore are coupled to the floor of the vehicle.

20 Claims, 15 Drawing Sheets

Related U.S. Application Data continuation of application No. 16/140,004, filed on Sep. 24, 2018, now Pat. No. 10,912,687.

(58) Field of Classification Search
CPC .... A61G 1/044; A61G 1/0567; A61G 3/0883; A61G 3/0891; A61G 3/0833
USPC .......................................... 296/20; 410/7, 80
See application file for complete search history.

(56) References Cited

U.S. PATENT DOCUMENTS

| | | | | |
|---|---|---|---|---|
| 5,205,601 | A * | 4/1993 | Ferris ........................ | A61G 1/06 410/7 |
| 5,779,296 | A | 7/1998 | Hewko | |
| 7,287,794 | B2 | 10/2007 | Bourgraf, Jr. et al. | |
| 7,549,690 | B2 | 6/2009 | Bourgraf et al. | |
| 7,861,341 | B2 | 1/2011 | Ayette et al. | |
| 7,887,113 | B2 * | 2/2011 | Lambarth ............ | A61G 1/0262 296/20 |
| 8,151,388 | B2 | 4/2012 | West | |
| 8,308,212 | B2 * | 11/2012 | Schrand ............... | A61G 1/0565 410/80 |
| 9,289,336 | B2 | 3/2016 | Lambarth et al. | |
| 10,512,571 | B2 * | 12/2019 | Carletti .................... | A61G 1/06 |
| 10,568,787 | B2 * | 2/2020 | Valentino ............. | A61G 3/0272 |
| 10,912,687 | B2 | 2/2021 | Girardin et al. | |
| 11,090,207 | B2 * | 8/2021 | Naber .................. | A61G 3/0875 |
| 11,529,273 | B2 | 12/2022 | Girardin et al. | |
| 2017/0252235 | A1 | 9/2017 | Valentino et al. | |
| 2020/0046583 | A1 | 2/2020 | King et al. | |

OTHER PUBLICATIONS

Communication dated Feb. 19, 2020 in PCT/US2019/052328.
Model 175 Fastening System, Users' Manual, Pub. No. 234-3163-04, Ferno-Washington, Inc.
Model 35A Series Mobile Transporter, Users' Manual, Pub. No. 234-3451-01, Ferno-Washington, Inc., Feb. 2011.

* cited by examiner

RESTRAINT SYSTEM

CROSS-REFERENCE TO RELATED APPLICATIONS

The present disclosure is a continuation of U.S. patent application Ser. No. 17/141,387, filed Jan. 5, 2021, entitled "Gurney Restraint System," which claims priority to U.S. patent application Ser. No. 16/140,004, filed Sep. 24, 2018, entitled "Gurney Restraint System," the disclosures of which are incorporated by reference in their entirety.

BACKGROUND

Technical Field

The embodiments described and claimed herein relate generally to gurney restraint systems for emergency vehicles. One embodiment comprises a gurney restraint system with features that integrate with typical ambulances to provide both forward and reverse compatibility with gurneys and ambulances deployed in the fleet.

Background Art

Ambulances are typically fitted with gurney restraint systems designed to prevent movement of a gurney (also referred to as a cot) when the ambulance is negotiating traffic conditions in an emergency-type environment. It is critical that these securement systems are capable of keeping the gurney, and the patient, firmly restrained in the event that the vehicle undergoes sudden driving maneuvers or a crash.

Typically, gurneys are secured with a standard antler and rail system that stabilizes the head end (also referred to as the loading end) of the gurney with a floor-mounted antler device and fixes the foot end (also referred to as the control end) of the gurney with a floor- or wall-mounted rail. In these systems, patients are typically secured to the gurney with one or more belts attached to the gurney frame, where the belts are designed to prevent movement of the patient during a collision.

One example of such a prior art antler and rail system is the Ferno Model 175 Fastening System ("Ferno System") 700 shown in FIGS. 1-5. The Ferno System 700 typically includes a floor-mounted antler 710 and a wall- or floor-mounted rail 720. To secure a gurney 730 in the Ferno System 700, an emergency medical technician ("EMT") will roll a gurney 730 into the ambulance and guide the gurney 730 into the antler 710 at an angle while keeping the control end 732 of the gurney 730 away from the rail 720, as best shown in FIG. 2. The EMT will continue to push the gurney 730 into the ambulance at an angle until the wheel fork 734 of the loading wheel 736 on the side opposite the rail 720 engages a hook portion 712 of the antler 710, as best shown in FIG. 3. Then, the EMT will slide the control end 732 of the gurney 730 in the direction A of the rail 720 (a lateral direction) until the jaws (a clamp) 722, 724, which are spring loaded, close around a fastener post 740 that is secured to the frame 742 on the control end 732 on the gurney 730, as best shown in FIG. 4.

To remove the gurney 730 from the Ferno System 700, the EMT will unlock the rail 720 by pushing the release handle 726 in direction B, which will place the jaws 722, 724 in an open position. The loading steps described above are then performed in reverse. To prevent the gurney 730 from inadvertently rolling out of the back of the ambulance during the unloading process, the Ferno System 700 will typically include a safety hook 750 that is installed on the ambulance floor near the rear doors. The safety hook 750 catches a safety bar 746 located at the loading end 738 of the gurney 730, as best shown in FIG. 5, to ensure that the loading end 738 of the gurney 730 remains secure inside the ambulance while the operators raise or lower the undercarriage 744 of the gurney 730 during loading or unloading. The safety bar 746 is biased in a lowered position so that it lies at about the same elevation as the safety hook 750, and may be raised by hand, after the undercarriage 744 is fully lowered, to allow the gurney 730 to be fully removed from the ambulance.

When it comes to safety, most prior art gurney restraint systems lag behind other types of restraint systems, such as those used to secure wheelchairs and wheelchair passengers. In particular, conventional gurney restraint systems, such as the Ferno System 700, are not adapted to adequately withstand the G forces exerted on the gurney and the patient during a crash. As a result, gurneys may come loose from the antler and rail assemblies during crashes, which can result in injury to both the patient and to the attendants in the vehicle.

The shortcomings of the prior art gurney restraint systems are at least partly due to the nature and urgency of ambulance utilization. Under emergency conditions, patients are often frail and must be transported rapidly, leaving less time to firmly secure the gurney to the vehicle. Patients also often must receive care during transportation, and as such, the restraint systems must occupy a limited amount of space so that the emergency medical personnel can easily navigate around the patient. Overall complexity may also be a barrier to ambulance restraint systems, as the associated manufacturing costs can be prohibitive.

New standards, such as SAE J3027, KKK-A-182(A-F), CAAS GVS-2015, and NFPA 1917, require improved securement in ambulances for the safety of both the patient and the ambulance attendants. For instance, certain standards now require the load bearing surfaces of a gurney to remain intact during front and rear side crash tests, and may limit occupant head excursions. Several gurney manufacturers have made available alternative devices that have improved crash safety. However, adoption of these devices has been very slow as a result of exorbitant costs and loss of forward and reverse compatibility within existing ambulance fleets. These newer systems are large, cumbersome, and complex and have costs that are prohibitive for large scale deployment. They are also difficult to remove for servicing and contain many trapping points for filth and contaminates.

Accordingly, it would be desirable to have a gurney restraint system that is not only designed to provide sufficient securement against G forces expected in a typical crash, but also is simple, low cost, and user friendly. It would additionally be desirable for this restraint system to be compatible with standard ambulance and gurney restraint designs, and to allow an EMT to use the same autonomic movements used with the conventional systems.

BRIEF SUMMARY

The embodiments described and claimed herein solve at least some of the problems of the prior art.

In one embodiment described and claimed herein, a prior art type gurney restraint system comprises a combination of a first gurney restraint for engaging with a loading end of the gurney, a second gurney restraint for engaging with a side of the gurney, and a third gurney restraint for engaging with a center region of the gurney. The first gurney restraint may be an antler-type restraint that includes a hook portion for receiving a wheel fork of the gurney. The second gurney restraint may be a rail-type restraint that includes a clamp for receiving a side member of the gurney. The third restraint may be a latch-type restraint that receives a latch member located on the underside of the gurney. The second gurney restraint and the third gurney restraint may be relatively positioned in the vehicle to lockingly engage with the gurney at approximately the same time in response to a lateral movement of the gurney. The third restraint may include a support bracket fixed to the underside of the gurney for holding the latch member. One or more of the occupant belts on the gurney may be directly connected to the support bracket so that occupant loads passing through those belts during an accident substantially bypass the gurney. In this way, the occupant loads are passed directly to the third gurney restraint, rather than passing through the gurney, which may not be designed to handle the full occupant load during a typical accident scenario.

In another embodiment, the third restraint may be provided in combination with a fourth restraint that is configured to prevent rotation of the gurney during an accident. The fourth restraint may take the form of one of either the first or second restraint described above.

These and additional embodiments described and claimed below provide a securement system that locks and stabilizes a patient gurney into an ambulance vehicle with features that provide both forward and reverse compatibility with gurneys and ambulances already on the market. The securement system is simple to operate and can be easily removed for servicing and cleaning. Its intuitive nature allows easy operation during times of high task load or stress. Additionally, the improved harness secures the patient further in the event of the crash, while facilitating ease of vital access by ambulance attendants, allowing better patient care.

Other embodiments, which include some combination of the features discussed above and below, and other features which are known in the art, are contemplated as falling within the claims even if such embodiments are not specifically identified and discussed herein.

Figure 1:
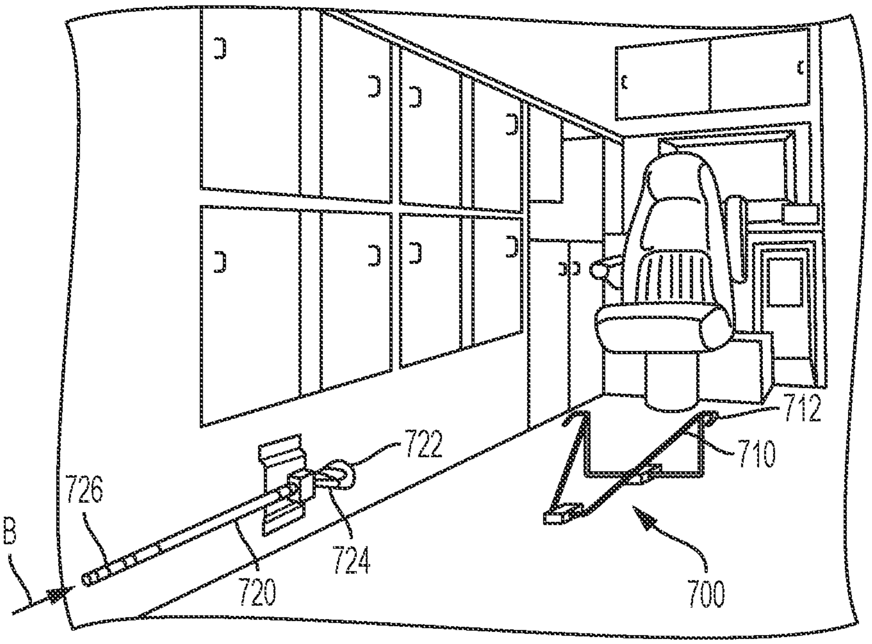
FIG. 1 PRIOR ART
FIG. 1 is a perspective view of a prior art gurney restraint system.
Figure 2:
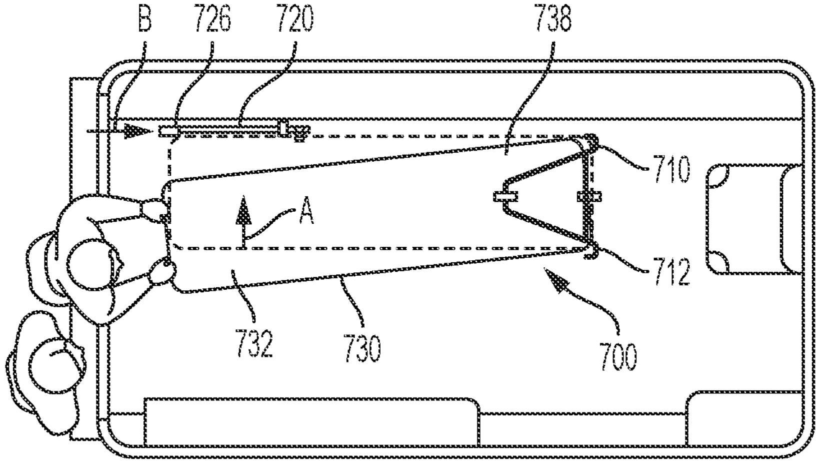
FIG. 2 PRIOR ART
FIG. 2 is a top plan view showing how an EMT loads and secures a gurney in the prior art gurney restraint system.
Figure 3:
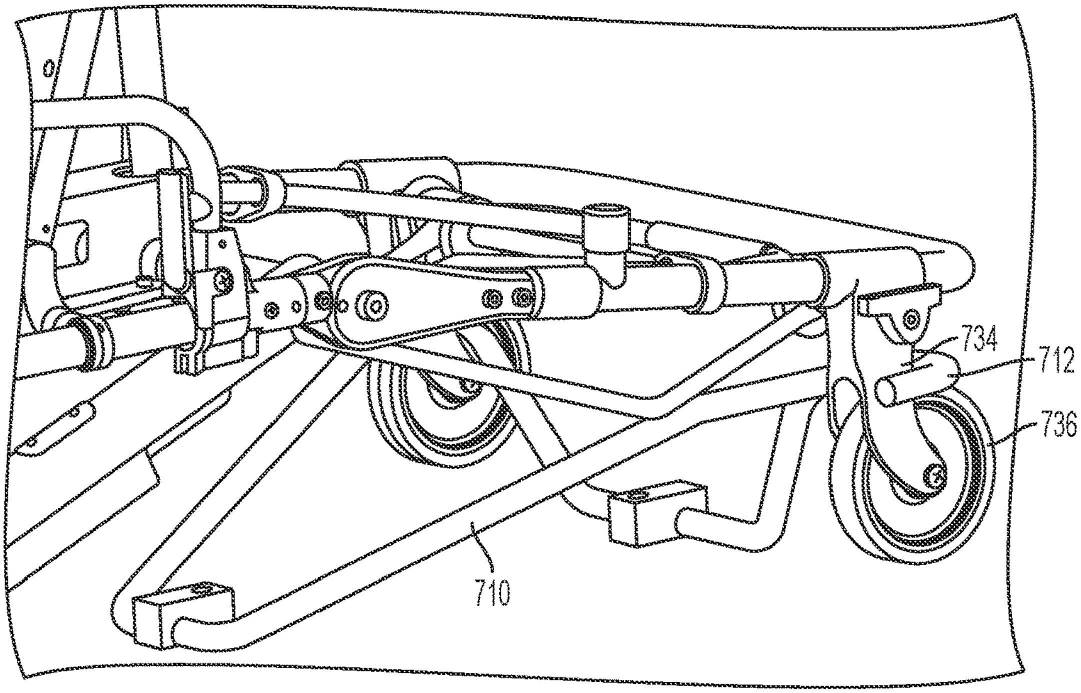
FIG. 3 PRIOR ART
FIG. 3 is a close-up perspective view showing how the loading end of a gurney is restrained in the antlers of the prior art gurney restraint system.
Figure 4:
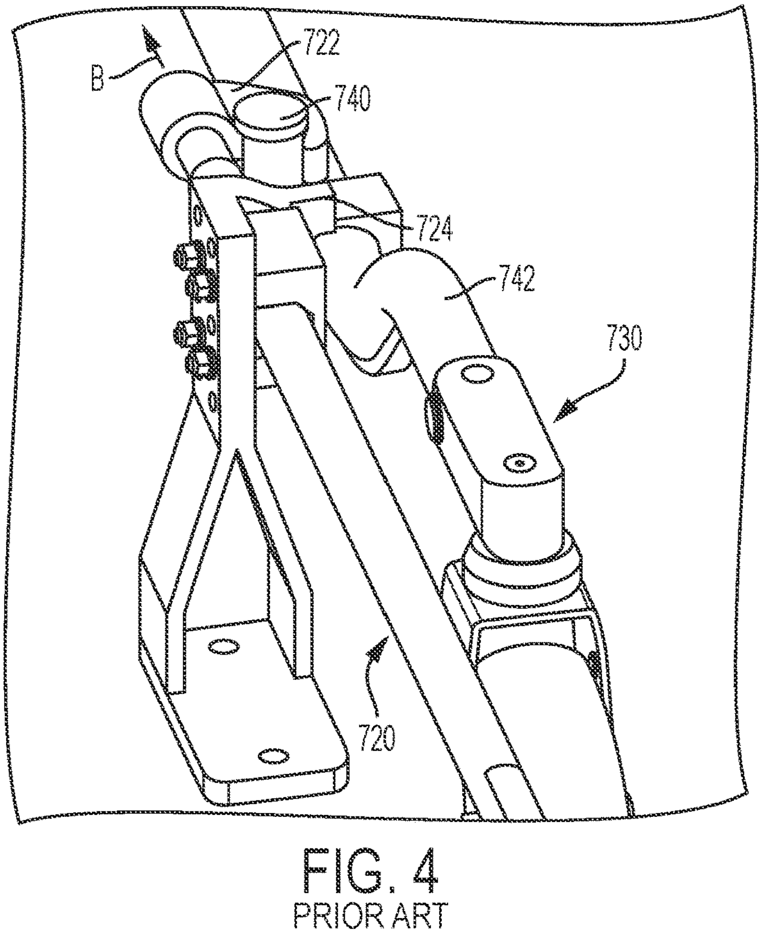
FIG. 4 PRIOR ART
FIG. 4 is a close-up perspective view showing how the control end or side of a gurney is restrained in the rail of the prior art gurney restraint system.

It should be understood that the drawings are not necessarily to scale and that the embodiments are sometimes illustrated by graphic symbols, phantom lines, diagrammatic representations and fragmentary views. In certain instances, details which are not necessary for an understanding of the embodiments described and claimed herein or which render other details difficult to perceive may have been omitted. It should be understood, of course, that the inventions described herein are not necessarily limited to the particular embodiments illustrated. Indeed, it is expected that persons of ordinary skill in the art may devise a number of alternative configurations that are similar and equivalent to the embodiments shown and described herein without departing from the spirit and scope of the claims.

Like reference numerals will be used to refer to like or similar parts from Figure to Figure in the following detailed description of the drawings.

DETAILED DESCRIPTION

Figure 6:
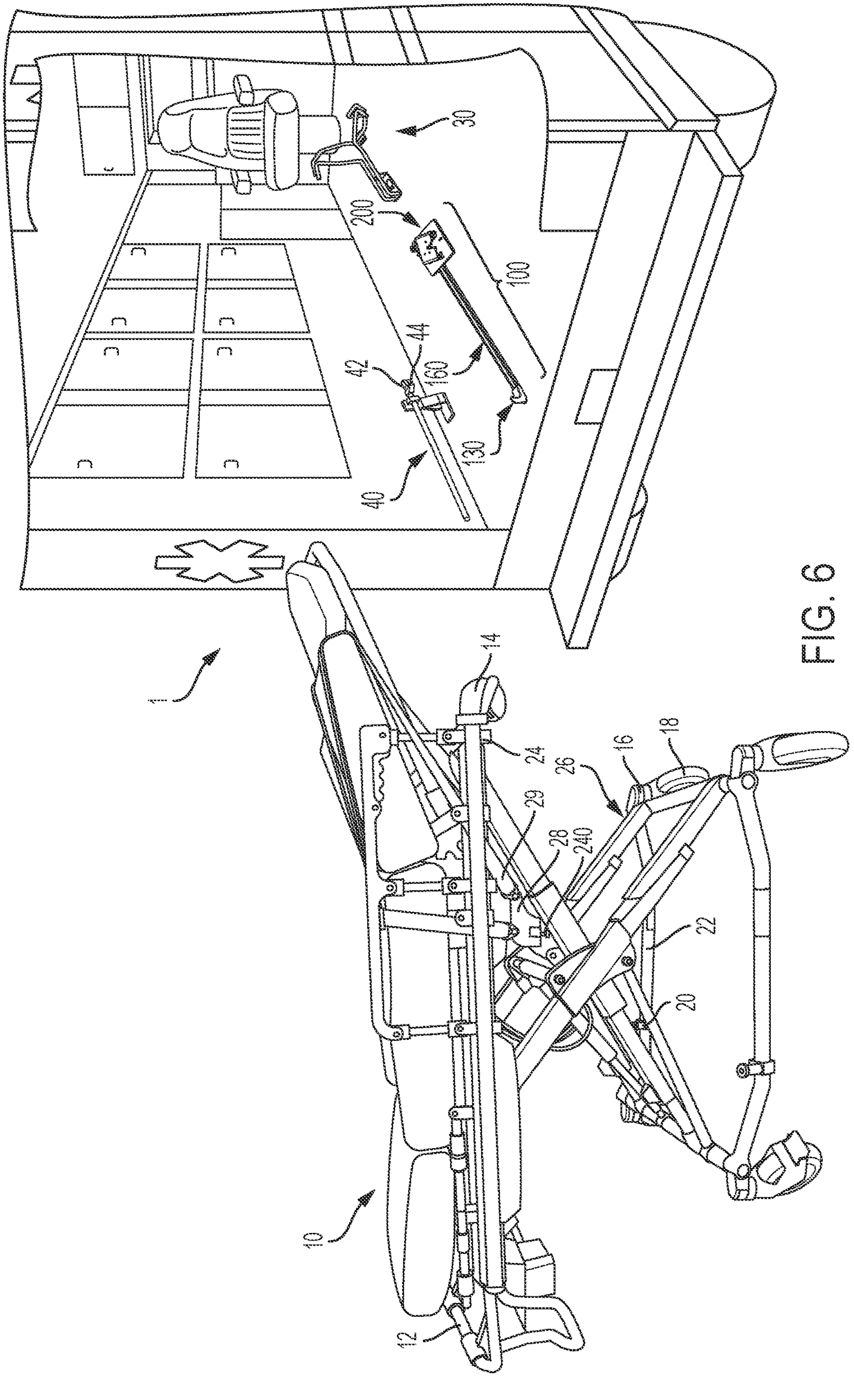
FIG. 6 is a perspective view of a first embodiment of the present gurney restraint system.

FIGS. 6-23 show various embodiments and components of a gurney restraint system 1. FIG. 6, in particular, shows a first embodiment of a gurney restraint system 1 for securing a gurney 10. In the first embodiment, the gurney restraint system 1 comprises a conventional gurney restraint system—including one similar to the Ferno System 700 described above, that includes a first (or loading end) restraint (such as antlers, as shown) 30 and a second (control end or side) restraint (such as a rail, as shown, also referred to herein as a side latch) 40—in combination with a third (or center) restraint (such as an anchor assembly, as shown) 100. The anchor assembly 100 may comprise four main components: (1) a center latch 200; (2) a center latch pin 240 adapted to be fixed to a load, such as the gurney 10, and to be releasably secured by the center latch 200; (3) a release member 130 that substitutes for the safety hook 750 of the prior art and can be manipulated to release the center latch pin 240 from the center latch 200; and (4) a push linkage assembly 160 that interconnects the release member 130 and the center latch 200.

Figure 7:
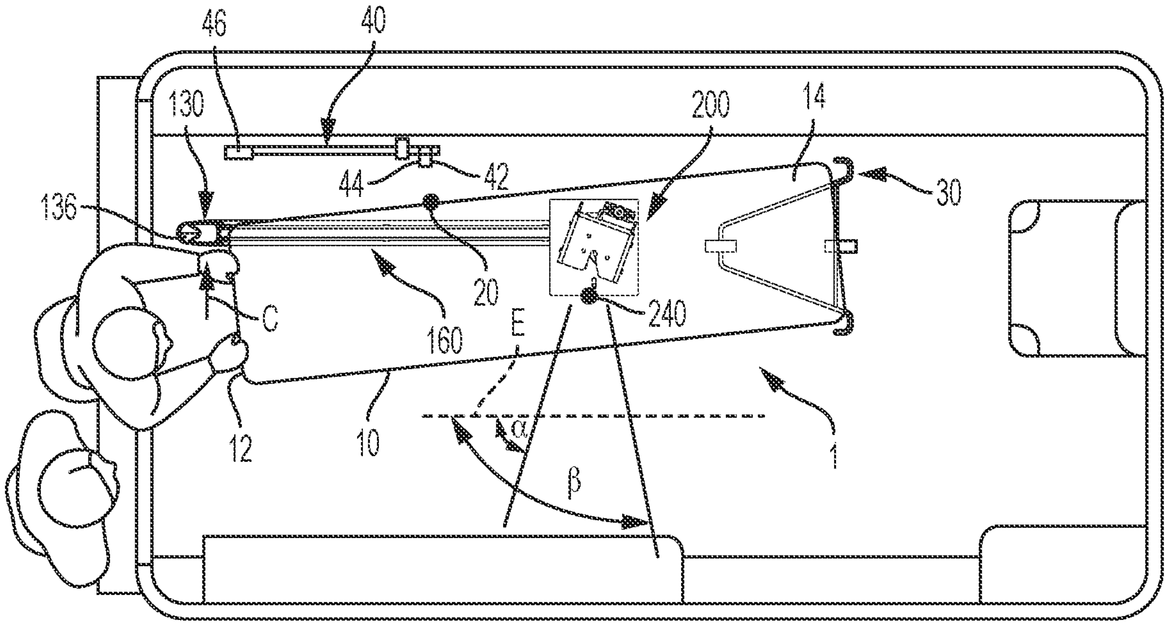
FIG. 7 is a first top plan view showing how an EMT loads and secures a gurney in the first embodiment of the present gurney restraint system.
Figure 8:
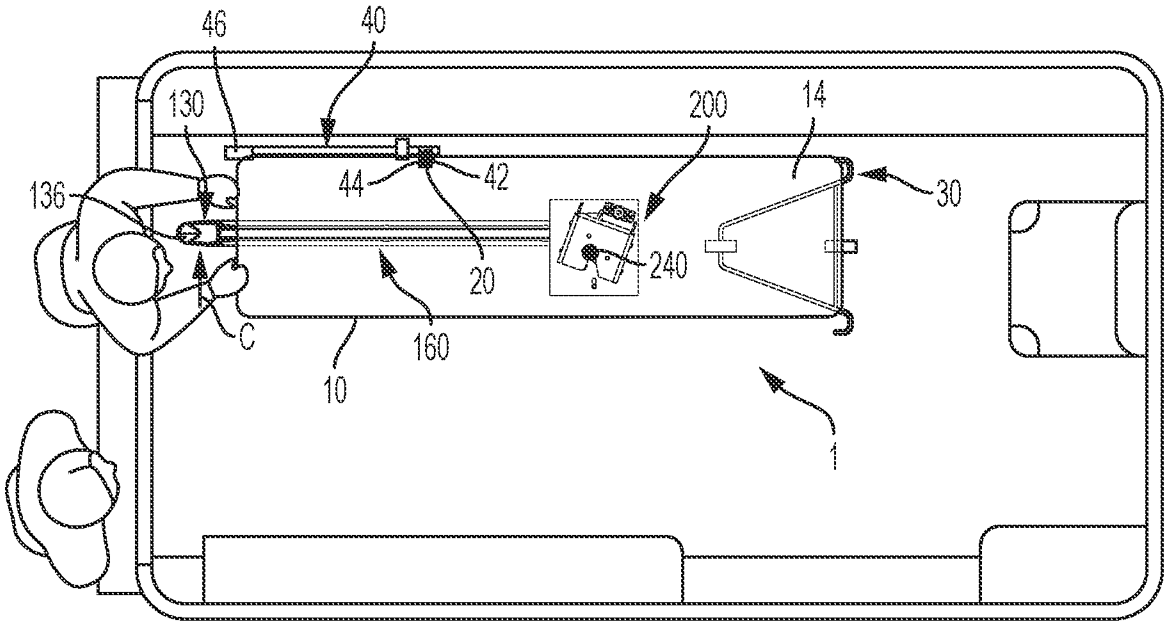
FIG. 8 is second top plan view showing how an EMT loads and secures a gurney in the first embodiment of the present gurney restraint system.

The anchor assembly 100 is configured to allow use of the same autonomic movements that an EMT would use to secure a gurney 10 in the Ferno System 700, as described above. In particular, to secure the gurney 10 in the gurney restraint system 1, an EMT will roll the gurney 10 into the ambulance and guide the gurney 10 into the antlers 30 at an angle while keeping the control end 12 of the gurney 10 away from the side latch 40, as best shown in FIG. 7. The EMT will continue to push the gurney 10 into the ambulance at an angle until the wheel fork 16 of the loading wheel 18 on the side opposite the rail 40 engages the antler 30. Then, the EMT will slide the control end 12 of the gurney 730 in the direction C of the side latch 40 until the jaws 42, 44 close around (i.e., clamp) a fastener post 20 that is secured to the frame 22 on the control end 12 on the gurney 10, as best shown in FIG. 8. At or about the same time the fastener post 20 is received and secured by the side latch 40, the center latch pin 240 will be received and secured by the center latch 200.

Figure 5:
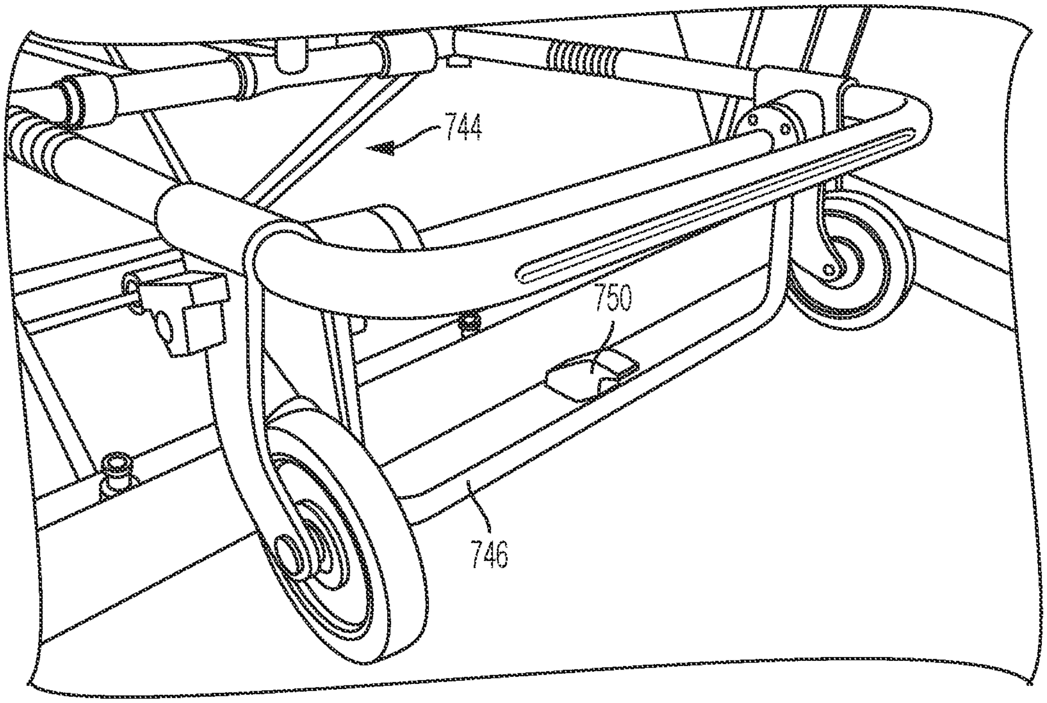
FIG. 5 PRIOR ART
FIG. 5 is a close-up perspective view showing the safety hook of the prior art gurney restraint system in use.

To remove the gurney 10 from the gurney restraint system 1, the EMT will unlock the rail 40 pushing the release handle 46 in direction D, which will place the jaws 42, 44 in an open position. The EMT will also manipulate the release member 130 to release the center latch pin 240 from the center latch 200. The loading steps described above are then performed in reverse. To prevent the gurney 10 from inadvertently rolling out of the back of the ambulance during the unloading process, the release member 130 is installed on the ambulance floor near the rear doors and includes a safety hook portion 136. The safety hook portion 136 catches a safety bar 24 located at the loading end 14 of the gurney 10, in the same manner as the prior art safety hook 750 shown in FIG. 5, to ensure that the loading end 14 of the gurney 10 remains inside the ambulance while the operators raise or lower the undercarriage 26 of the gurney 10 during loading or unloading.

Use of the anchor assembly 100 with a conventional Ferno-type system in this manner provides additional stability for the patient gurney 10 beyond that which can be provided by the prior art system alone, thus preventing unintended movement that is discomforting and potentially dangerous for both the patient and accompanying attendant. The anchor assembly 100 also reduces the chance of failure in the event of a crash, as compared to use of the Ferno-type restraint system along.

Figure 9:
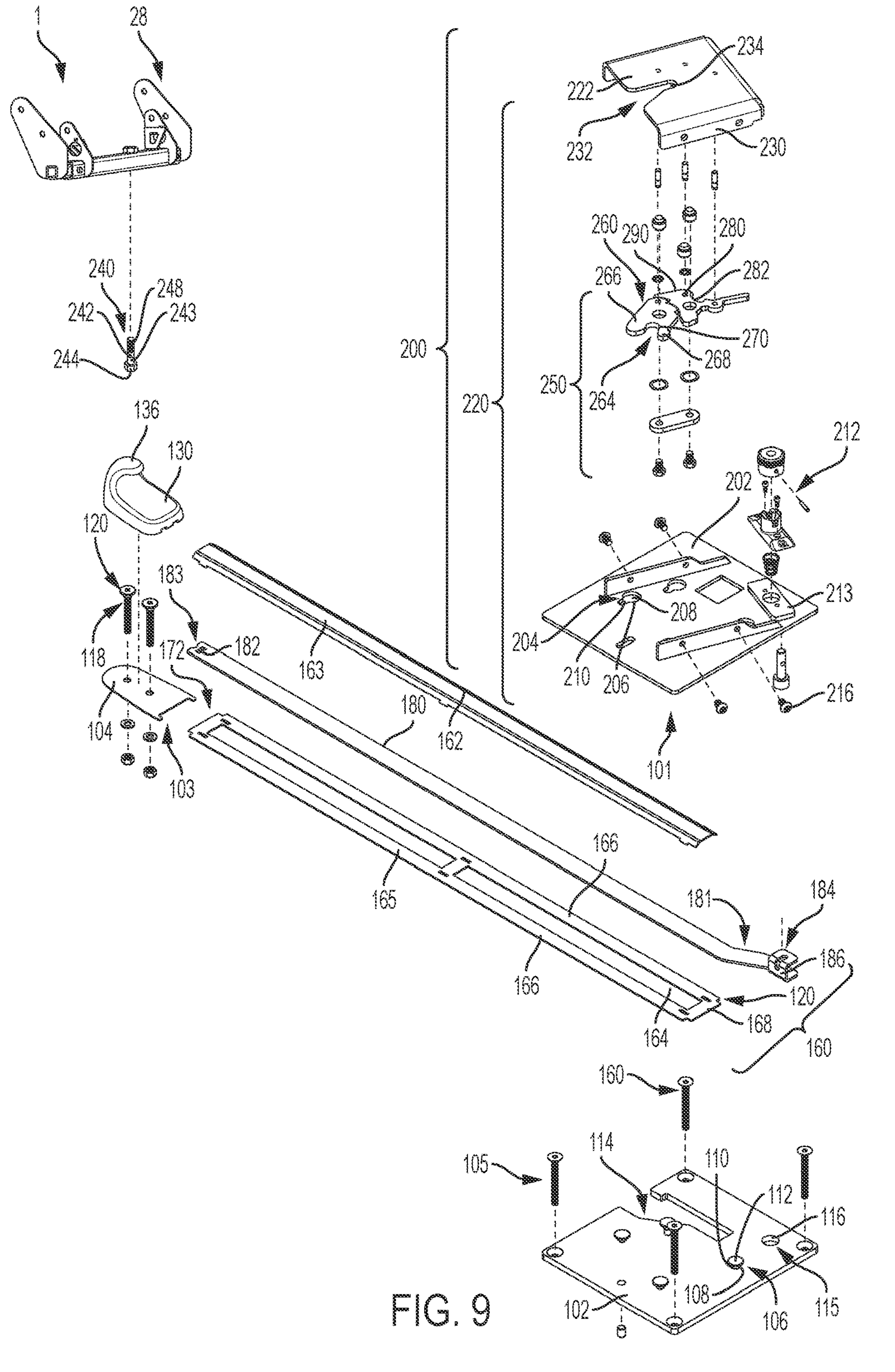
FIG. 9 is an exploded view of the center restraint assembly for the first embodiment of the present gurney restraint system.

Turning now to FIG. 9, the anchor assembly 100 is shown in a partially-exploded view. The anchor assembly 100 is installed in the ambulance by, first, attaching a center latch mounting member (or base) 101 and a release member mounting member (or base) 103 to the ambulance floor using known techniques, such as bolting. The attachment may be permanent or detachable by hand or tool. The center latch mounting member 101 may be a center latch mounting plate 102. Likewise, the release member mounting member 103 may be a release member mounting plate 104.

The mounting plates 102, 104 may be located in specific, spaced-apart positions relative to the optimal secured position of the gurney 10. As can be seen in FIGS. 6-8, the center latch mounting plate 102 may be installed to the ambulance floor directly underneath and near the center of the location where the gurney 10 will be secured in the ambulance (either or both laterally and longitudinally). The release member mounting plate 104 may be installed near the ambulance rear doors and laterally aligned with approximately the center of the location where the gurney 10 will be secured in the ambulance, although preferably to one side of center. In that respect, most or all of the anchor assembly 100 will be located underneath the gurney 10 when in use, thereby preserving valuable space in the ambulance that is needed by the EMT to navigate around the patient. For the avoidance of doubt, the exact location of the mounting plates 102, 104 may be modified as necessary according to the design requirements of the ambulance and the gurney 10.

As depicted in the figures, the center latch mounting plate 102 may be permanently bolted to the floor of the ambulance using bolts 105 and may include mounting details 106 for securely engaging with the center latch 200. The mounting details 106 may be any form of connector for connecting with the center latch 200. As depicted, the mounting details 106 comprise headed studs 108 with a base shaft portion 110 and a head portion 112, where the head portion 112 has a larger diameter or size than the base shaft portion 110. The headed studs 108 are configured to engage with keyhole slots 206 in the center latch 200. More particularly, the keyhole slots 206 include an opening portion 208 that is continuous with a slot portion 210. The opening portion 208 may be round (or any other shape that corresponds to head portion 112) and may have a diameter or size that corresponds with (slightly larger than) the diameter or size of the head portion 112, and allows the head portion 112 to be received therethrough. The base shaft portion 110 may be circular in cross section, or any other shape, such as square. The width of the slot portion 210 corresponds with (slightly larger than) the diameter or width of the base shaft portion 110 (but, the width of the slot portion 210 is smaller than the diameter or width of the head portion 112), whereby the headed stud 108 can be slid relative to and into locking engagement with the keyhole slot 206. With the base shaft portion 110 positioned within the slot portion 210, the stud 108 will not be able to be removed from the keyhole slot 206 due to the dimensional differences between the width of the slot portion 210 and the diameter of the head portion 112. It is contemplated that the bolts 105 and mounting details 106 may be combined into a single component, as described below for bolts 118 that secure the release member mounting plate 104 to the ambulance floor.

The center latch mounting plate 102 may further include a cutout 114 for receiving a first end 181 and/or center latch manipulating member 184 of the push linkage assembly 160, as described in more detail below. The center latch mounting plate 102 may further include a center latch engagement member 115, such as a bore 116, for engaging with a mounting plate engagement member 212 disposed on the center latch 200, for securing the center latch 200 to the center latch mounting plate 102.

The release member mounting plate 104 may also be permanently bolted to the floor of the vehicle and include mounting details for securing engaging with the release member 130. The bolts and mounting details for the release member mounting plate 104 may be separate components, as with the center latch mounting plate 102. Alternatively, as shown, the bolts 118 that secure the release member mounting plate 104 to the floor themselves may include the mounting details 120 at their top end. The mounting details 120 may be any form of connector for connecting with the release member, although, as depicted, the mounting details 120 are essentially the same as the mounting details 106 present on the center latch mounting member 102, and engage with keyhole slots 134 disposed on the underside of the release member 130 in a similar way as the mounting details 106 engage with keyhole slots 206.

It is contemplated that another embodiment of the anchor assembly 100 (not shown) may omit the mounting members 101, 103 (i.e., mounting plates 102, 104). In such an embodiment, the mountings details for the release member 130 and center latch 200 may be provided by the floor of the ambulance, for example by directly attaching bolts with mounting details (similar to bolts 118) to the ambulance floor.

After the mounting plates 102, 104 (or mounting details, in the alternative embodiment) are installed on the ambulance floor, but before the release member 130 and center latch 200 are installed, the push linkage assembly 160 may be inserted in the space separating the mounting plates 102, 104. The push linkage assembly 160 may comprise channel member 162 and link (or sliding bar) 180. The channel member 162 may define a longitudinally aligned raised portion 164 and depressed side members 166, which, when placed on the ambulance floor, may define a channel 168 within which the link 180 is disposed, enclosed, and protected. As shown, however, the channel member 162 is comprised of an upper member 163 and a lower member 165. The upper member 163 has an inverted U-shape, while the lower member 165 serves as a generally flat base. The upper member 163 and lower member 165, when assembled, define the channel 168 within which the link 180 is disposed, enclosed, and protected. It is contemplated that the upper member 163 and lower member 165 need not be separate components, but may be formed as a unitary member, such as by extrusion.

In any event, the channel 168 is configured to receive the link 180 and allows the link 180 to slide or translate back and forth in a longitudinal direction. The opposite ends of the channel member 162 may define flanges 170, 172 that abut or engage corresponding edges of the mounting plates 102, 104 that include corresponding flanges. Flanges 170, 172 and the flanges at the edges of the mounting plates 102, 104 prevent lateral movement of the push link assembly 160 relative to the mounting plates 102, 104. The link 180 is longer than the channel member 162 and has a first end 181 that may extend beyond flange 170 and a second end 183 that may extend beyond flange 172. The second end 183 may include a release member engaging member 182 that engages with the release member 130, whereby manipulation of the release member 130, for example by pushing or pulling in a longitudinal direction, will cause the link 180 to translate back and forth within the channel 168. As depicted, the release member engaging member 182 is a bore or depressed portion that receives a first link engaging member 132, such as a projection or raised portion present on the underside of the release member 130, as described in further detail below. In the disclosed embodiment, the second end 183 is disposed (in an elevational sense) between the release member mounting plate 104 and the release member 130 in an installed configuration. The first end 181 may include a center latch manipulating member 184 that engages with the center latch 200 to place the center latch 200 in a locked or unlocked condition, respectively, in response to manipulation of the release member 130 and translation of the link 180 within channel 168. In the disclosed embodiment, the first end 181 is disposed within cutout 114 of the center latch mounting plate 102 and below the center latch 200 in an installed configuration, and engages with the center latch 200 from an underside.

Figure 10:
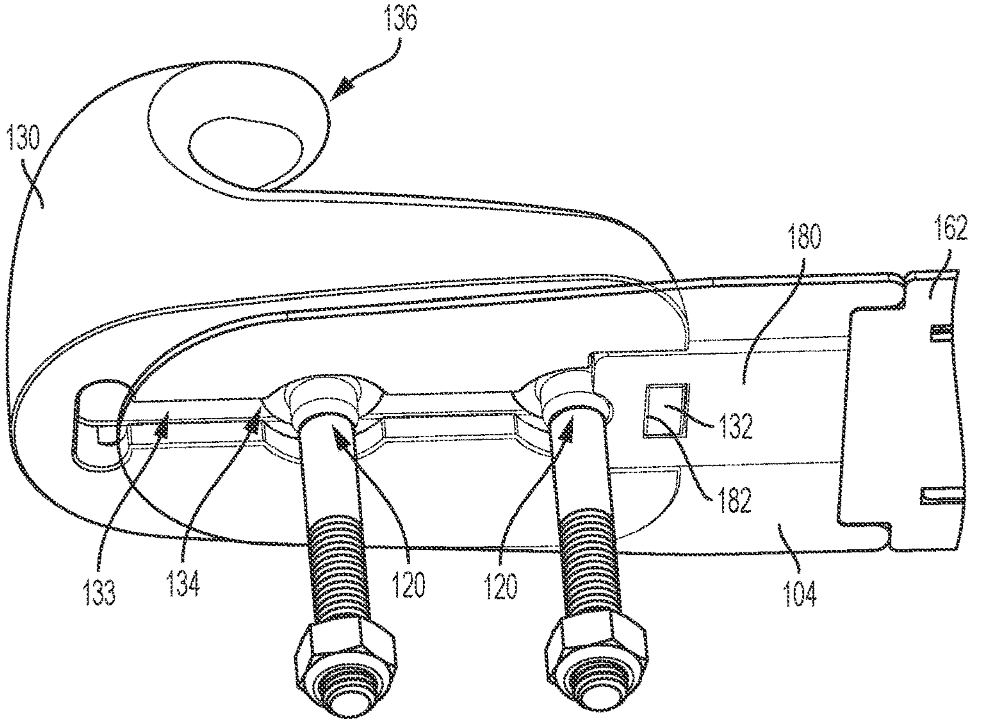
FIG. 10 is a first perspective view showing the underside of the release member for the first embodiment of the present gurney restraint system.
Figure 11:
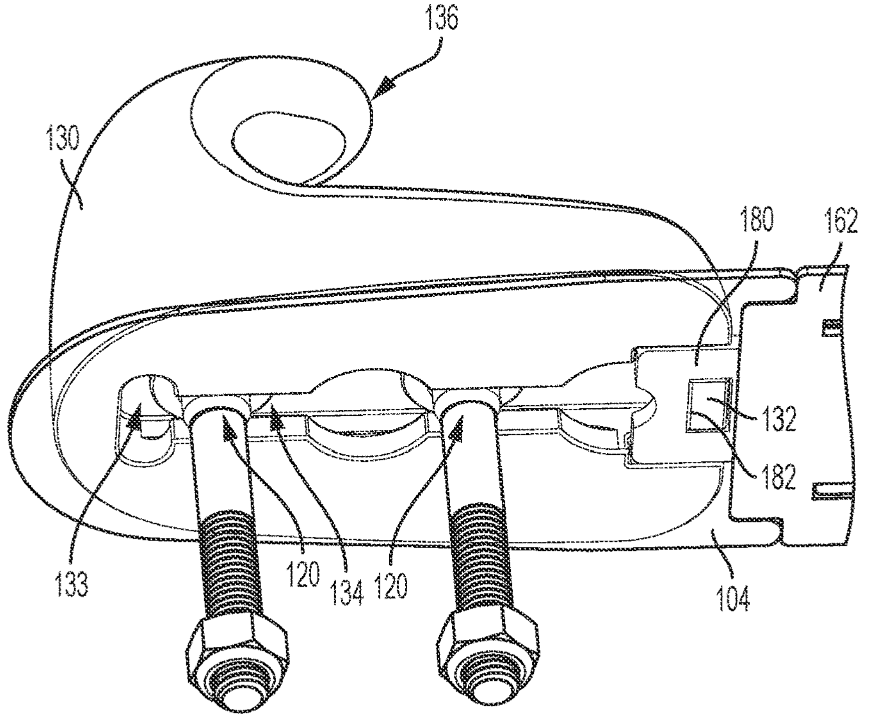
FIG. 11 is a second perspective view showing the underside of the release member for the first embodiment of the present gurney restraint system.
Figure 12:
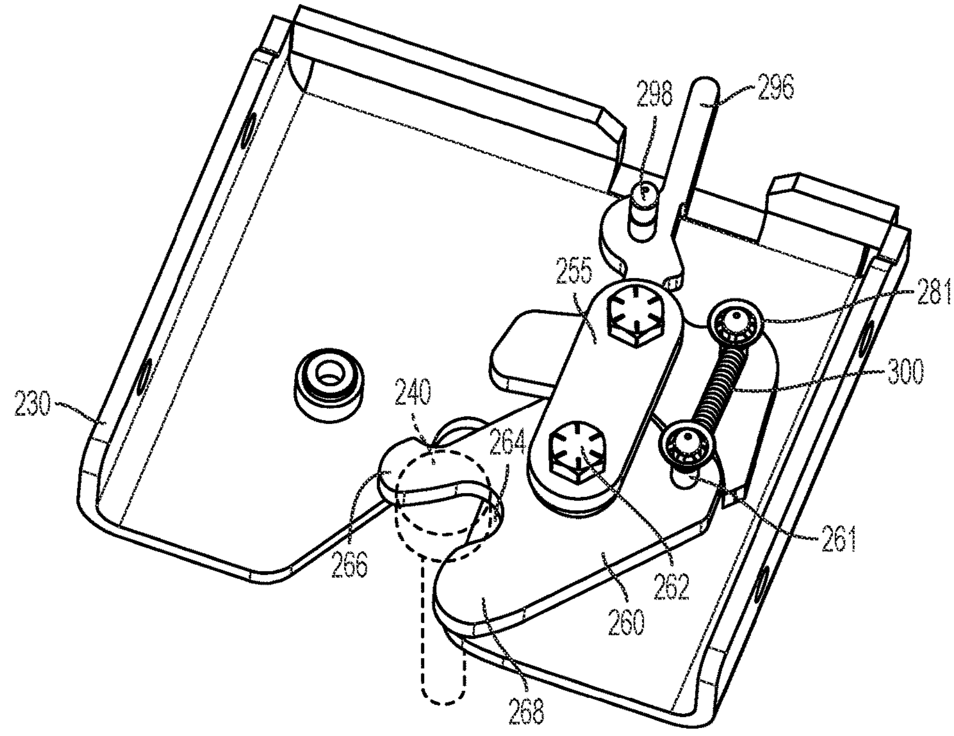
FIG. 12 is a first perspective view showing the internal components of the center latch (inverted) for the first embodiment of the present gurney restraint system.

After the push linkage assembly is inserted in the space between the mounting plates 102, 104, the link 180 pushed toward the rear of the ambulance until it is touching the mounting detail 120. Next, the release member 130 may installed on the release member mounting plate 104. As best shown in FIGS. 10-11, the underside of the release member 130 includes release member mounting details 133 that are correspondingly positioned with a set of mounting details 120 positioned on the release member mounting plate 104. In the depicted embodiments, the release member mounting details 133 are keyhole slots 134, and the corresponding mounting details 120 are headed studs. However, it is contemplated that studs may be located on the release member 130 and corresponding keyhole slots may be provided on the release member mounting plate 104 (not shown). By doing so, the release member mounting plate remains smooth and free of tripping hazards.

The release member mounting details 133 may be provided in the form of interconnected keyhole slots 134, as shown, or multiple separate keyhole slots (not shown). As shown in FIG. 10, pushing the link 180 rearward before installing the release member 130 allows the release member engaging member 182 to be aligned with and receive the first link engaging member 132 when the release member 130 is installed on the release member mounting plate 104 (i.e., when the keyhole slots 134 on the release member 130 register with mounting details 120 on the release member mounting plate 104, as best shown in FIG. 10). Once installed on the release member mounting plate 104, the release member 130 is then pushed toward the front of the ambulance, whereby the mounting details will be fully engaged with the mounting details 120 in keyhole slots 134, as best shown in FIG. 11. As will be described in more detail below, the center latch 200 includes a second sliding link engaging member 99 that will engage with center latch manipulating member 184 (of course, once the center latch 200 is installed on the center latch mounting plate 102). The second sliding link engaging member 299 prevents the link 180 from over-travelling in the rearward direction (toward the rear of the ambulance). More specifically, the release member 130 will not be able to over-travel back to where it can be removed (i.e., back to the position shown in FIG. 10).

Referring again to FIG. 9, after the release member 130 is installed on the release member mounting plate 104 and pushed in a forward direction, the center latch 200 may be installed on the center latch mounting plate 102. More particularly, the center latch 200 includes a base 202 with a set of center latch mounting details 204 correspondingly positioned with a set of mounting details 106 positioned on the center latch mounting plate 102. In the depicted embodiments, the center latch mounting details 204 are keyhole slots 206, and the corresponding mounting details 106 are headed studs 108. However, it is contemplated that studs may be located on the center latch 200 and corresponding keyhole slots may be provided on the center latch mounting plate 102 (not shown). By doing so, the center latch mounting plate remains smooth and free of tripping hazards.

As depicted, the set of keyhole slots 206 on the base 202 of the center latch 200 are aligned in parallel. In that respect, the center latch 200 may be secured to the center latch mounting plate 102 by registering the keyhole slots 206 with the mounting details 106 and sliding the center latch in a straight line (in a direction parallel to the length of the slot portion 210 of the keyhole slot) until the center latch engagement member 115 engages with the mounting plate engagement member 212. It is contemplated that the engagement and locking means may also be achieved by rotational displacement instead of straight-line displacement, by arranging the keyhole slots in a circular orientation (not shown). The center latch engagement member 115 and the mounting plate engagement member 212 may take the form of any type of corresponding connectors but, as shown may be a bore 116 and a quick release, spring loaded locking pin 213, respectively.

The spring loaded locking pin 213 prevents lateral or rotational movement once it is engaged with the bore 116 in the center latch mounting plate 102. The spring loaded locking pin 213 is secured in the engaged position by rotating one quarter turn in a typical bayonet-locking fashion. Alternatively, the spring loaded locking pin 213 can be equipped with male threads that match female threads cut into the receiving detail (i.e., bore 116) of the center latch mounting plate 102, thus requiring multiple turns to fully engage or disengage. Optionally, the spring loaded locking pin 213 can be monitored with a contact linked to a electrical monitoring circuit, which allows visual or auditory notice to be provided to the user that the gurney restraint system is either or both in a safe condition and not in a safe condition.

The center latch 200 further includes a housing 220 that comprises an upper shell 240 and the base 202, whereby the upper shell 230 connects with the base 202 via bolts 216. The upper shell 230 includes a guide slots 232 for receiving and guiding the center latch pin 240 into engagement with center latch locking assembly 250. The guide slot 232 is wider near the leading edge 222 of the housing 200 and tapers to a narrow channel 234. In that respect, with particular reference again to FIG. 7, the guide slot 232 allows the center latch pin 240 to enter the center latch 200 at an angle between angle α to angle β from a longudinal axis E. The values of these angles can be adjusted based on space available, pin position, and/or for other ergonics and securement reasons. In one embodiment, angle α may be 65° and angle β may be 90°. In another embodiment, angle α may be 30° and angle β may be 110°. In yet another embodiment, angle α may range from 30°-70° and angle β may range from 90°-115°, but is not necessarily limited to these values.

Figure 13:
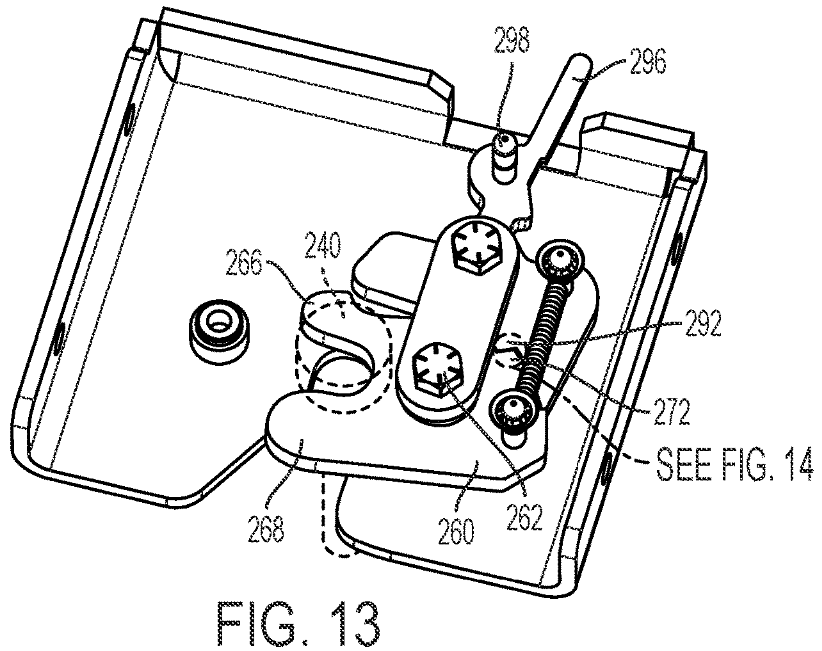
FIG. 13 is a second perspective view showing the internal components of the center latch (inverted) for the first embodiment of the present gurney restraint system.

The center latch locking assembly 250 may be a linkage assembly comprising a first link 260 that is bolted at a first link pivot point 262 to the upper shell 230. The first link 260 is configured to pivot about the first link pivot point 262, and includes a center latch pin receiving portion 264. The center latch pin receiving portion 264 is defined by a first arm 266 and a second arm 268. When the center latch locking assembly 250 is in an unlocked condition, shown in FIG. 12, the first arm 266 is positioned to block at least a portion of the guide slot 232. In the depicted embodiment, the first arm 266 blocks the channel 234. As the center latch pin 240 enters the guide slot 232 (e.g., when the EMT pushes the control end 12 of the gurney 10 in direction C as shown in FIGS. 7-8), the center latch pin 240 will contact the first arm 266 and cause the first link 260 to pivot (in a counterclockwise direction as viewed from above in FIG. 9, and clockwise when view from the underside in FIGS. 12-13) about the first link pivot point 262. As shown in FIG. 13, continued lateral thrusting of the gurney 30 in direction C will cause the center latch pin 240 to continue to rotate the first link 260 and to enter the channel 234. At this point, the second arm 268 is blocking the channel 234, securing the center latch pin 240 in the center latch 200.

Figure 14:
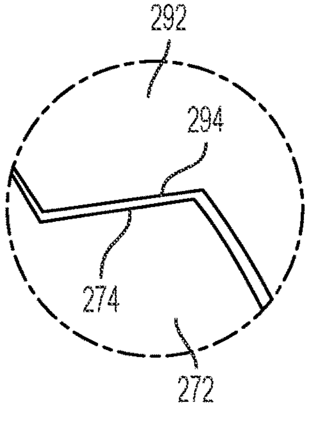
FIG. 14 is a close-up perspective view showing the locking engagement surfaces of the links inside of the center latch (inverted) for the first embodiment of the present gurney restraint system.
Figure 15:
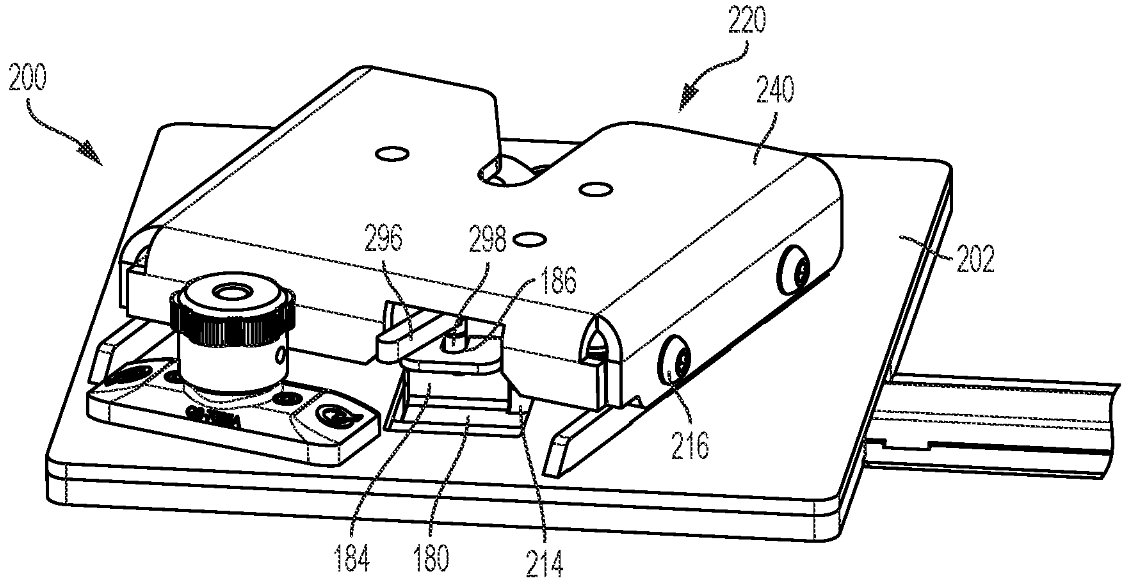
FIG. 15 is a side perspective view of the center latch for the first embodiment of the present gurney restraint system.
Figure 16:
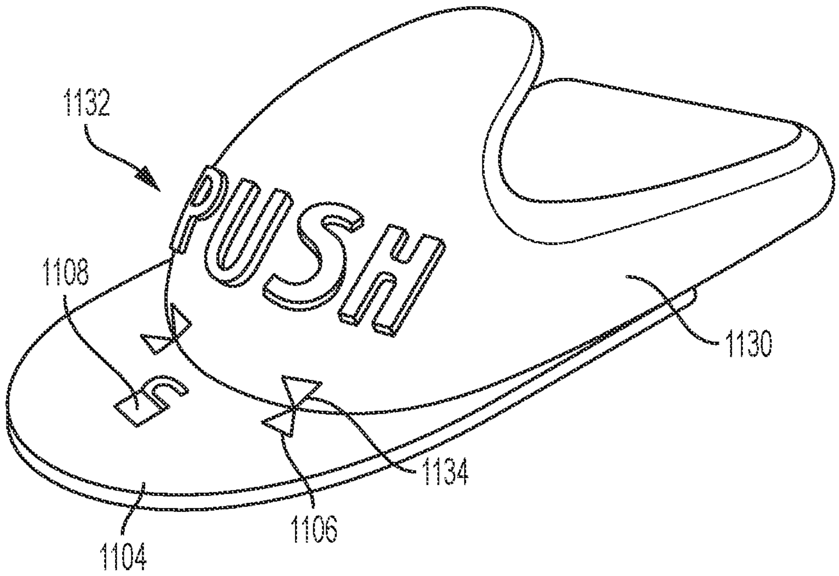
FIG. 16 is a perspective view of a first alternative embodiment of a release member for the present gurney restraint system that include visual indicia of the locking state of the restraint system.
Figure 17:
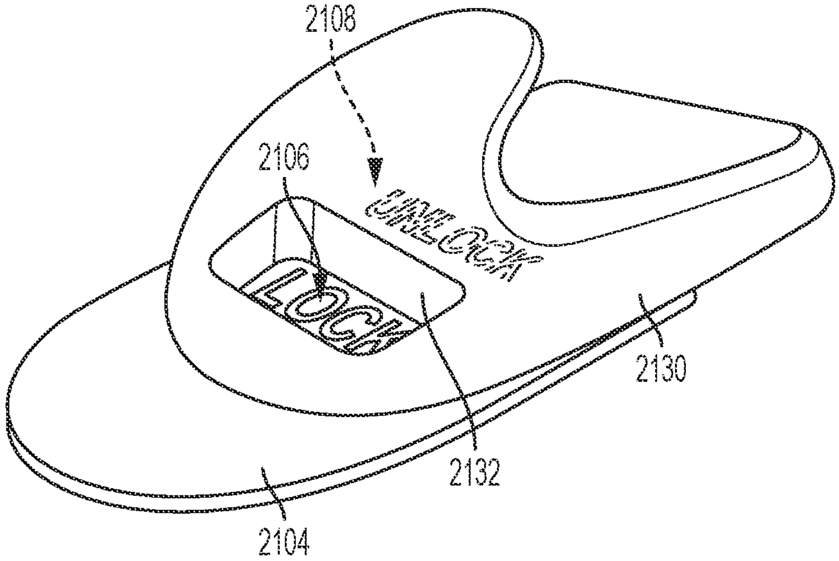
FIG. 17 is a perspective view of a second alternative embodiment of a release member for the present gurney restraint system that include visual indicia of the locking state of the restraint system.

The center latch locking assembly 250 further includes a second link 280 that is bolted at a second link pivot point 282 to the upper shell 230, and is linked to the first link 260 via both the upper shell 230 and a linking member 255. The second link 280 includes a second link cam surface 290 that abuts a first link cam surface 270 on the first link 260. A spring 300 extends between the first link 260 (at a first link post 261) and the second link 280 (at a second link post 281) and is biased to hold the first link cam surface 270 and second link cam surface 290 in contact. The first link cam surface 270 includes a first interference member 272 and the second link cam surface 290 includes a second interference member 292. When the first link 260 is rotated from an unlocked position (shown in FIG. 12) to a locked position (shown in FIG. 13), the first interference member 272 passes over the second interference member 292, whereby a first interference face 274 of the first interference member 272 engages a second interference face 294 of the second interference member 292 (as best shown in FIG. 14). Engagement between the first interference face 274 and the second interference face 294 prevents the first link 260 from rotating (in a clockwise direction when viewed from above in FIG. 9, and counter clockwise when viewed from below in FIGS. 12-14). Notably, the spring 300 holds the first interference member 272 in engagement with the second interference member 282.

When the first interference member 272 is engaged with the second interference member 292, no amount of force exerted by the center latch pin 240 (other than a destructive amount of force), can cause the first interference member 272 to disengage from the second interference member 292. This is because interference faces 274, 294 are oriented in a direction toward the first link pivot point 262 (i.e, line extensions from the interference faces 274, 294 will intersect or approximately intersect the first link pivot point 262, or come in the near vicinity).

However, because the interference faces 274, 294 are oriented at a relatively large angle relative to the second link pivot point 282 (i.e, line extensions from the interference faces 274, 294 do not intersect the second link pivot point 282, or come even remotely close), only a relatively small rotational force (in a clockwise direction) need be applied to the second link 280 to disengage the second interference member 292 from the first interference member 272, thereby unlocking the center latch 200 and releasing the center latch pin 240 from the center latch 200. Such a rotational force can be manually applied to the second link 280 using release arm 296 which is connected to the second link and extends partially outside of the housing 220. Once the second interference member 292 is disengaged from the first interference member 272, the residual force in the spring 300 will cause the first link 160 to continue to rotate (in a clockwise direction when viewed from above in FIG. 9 and in a counterclockwise direction when viewed from below in FIGS. 12-13), whereby the first arm 266 will urge (or eject) the center latch pin 240 in a direction out of the channel 234. Notably, the release arm 296 may serve as an emergency release mechanism. Upon reaching under the gurney and manually displacing the release arm 296, the center latch 200 releases and the pre-loaded spring 300 eject the center latch pin 240 from the center latch 200. This alternate mechanical release mechanism can facilitate emergency gurney removal in the event of a component or system failure.

Notably, the second link 280 includes a release post 298 that may be disposed on a portion of the release arm 296. The release post 298 may serve as the second link engaging member 299, which engages with a slot 186 in the center latch manipulating member 184, as best shown in FIG. 14. The base 202 of the center latch 200 includes an opening 214 that accommodates and receives the center latch manipulating member 184, so that it may engage with the release post 298. As can be appreciated, the center latch pin 240 can be released from the center latch 200 by pushing on the release member 130, which causes the center latch manipulating member 184 of link 180 to push release post 298 and rotate the second link 280 (in a clockwise direction when viewed from above in FIG. 9 and counterclockwise when viewed from below in FIGS. 12-13).

While the center latch locking assembly 250 is shown mounted to the upper shell 230, it is contemplated that it may also be mounted to the base 202.

The center latch pin 240, as best illustrated in FIG. 6, may comprise a shaft portion 242 and a head portion 244, and may be mounted to an underside of the gurney 30 in a head-down configuration. Notably, shaft portion 242 and head portion 244 may be rounded, or any other shape, so long as the diameter or width of the shaft portion 242 is less than the widths of the center latch pin receiving portion 264 and channel 234 (whereby the center latch pin 240 can be received by the center latch 200), and so long as the diameter or width of the head portion 244 is greater than the widths of the center latch pin receiving portion 264 and channel 234 (whereby the center latch pin 240 cannot be disengaged from the center latch 200 in a vertical direction). In the depicted embodiment, the shaft portion 242 may include a reduced dimension portion 246 that is received in the channel 234 and engaged with the center latch pin receiving portion 264. The reduced dimension portion 246 provides increased tolerance between the center latch pin 240 and the guide slot 232 , without significantly reducing the overall strength of the center latch pin, including the connection between the center latch pin 240 and the gurney 10. In that regard, the shaft portion 242 of the center latch pin 240 has threads 248 for securement to a gurney bracket 28, as best shown in FIG. 6. The threads allow for height adjustment of the center latch pin 240 to ensure proper engagement with the center latch 200. The gurney bracket 28 may be mounted to a frame 22 of the gurney 10, including to the undercarriage 26. Preferable, the at least one or more or all of the occupant belts 29, such as the shoulder restraint belts, are routed directly to and attached to the gurney bracket 28 so that a substantial portion of the occupant load during an accident bypasses the gurney frame and is transferred directly to the center latch 200.

The center latch pin 240 should be mounted to the gurney so that, when the undercarriage is collapsed and the gurney is being pushed into the ambulance, the head portion 244 of the center latch pin 240 is at an elevation corresponding to the center latch 200 and will properly engage with the center latch. Moreover, the center latch pin 240 may be mounted, in a lateral direction, to one side of the centerline of the gurney, preferably on the side opposite the side latch 40. This asymmetric position of the center latch pin 240 and center latch 200 improves overall gurney securement when combined with a side latch 40.

In alternative embodiments, the release member 130 can have visual indicators that provide feedback for the operator regarding the locked or unlocked status of the center latch 200 and/or indicate the direction of force to be applied for release actuation. For example, in the embodiment in FIG. 16 formed on the release member 1130 is the word "PUSH" 1132 in raised text to instruct the operator on direction of force to be applied to release the gurney 10. The release member 1130 can also have arrows 1134 that align with arrows 1106 on release member mounting plate 1104 when the release member 1130 has been shifted an unlocked position. Furthermore, the release member mounting plate 1104 may further have an image 1108 of an open lock that is covered by the release member 1130 when located in the locked position. As another example, in the FIG. 17 embodiment, the release member mounting plate 2104 may have the word "LOCK" 2106 or an image of a closed lock, which is only visible through an opening 2132 in the release member 2130 when the release member 2130 is located in a locked position. The release member mounting plate 2104 may further or alternatively have the word "UNLOCK" 2108 or an image of a opened lock, which is only visible through the opening 2132 in the release member 2130 when the release member 2130 is located in a locked position.

Figure 18:
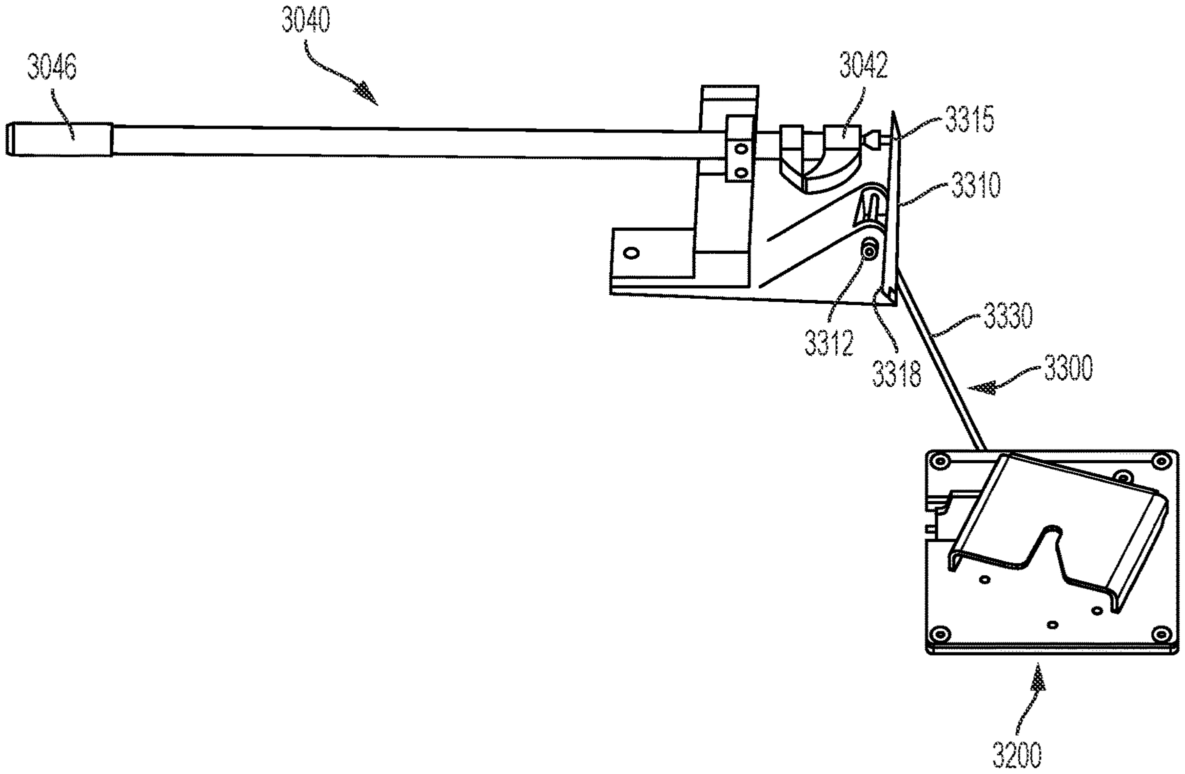
FIG. 18 is a perspective view of an alternative embodiment of a side rail and center latch for the present gurney restraint system.
Figure 19:
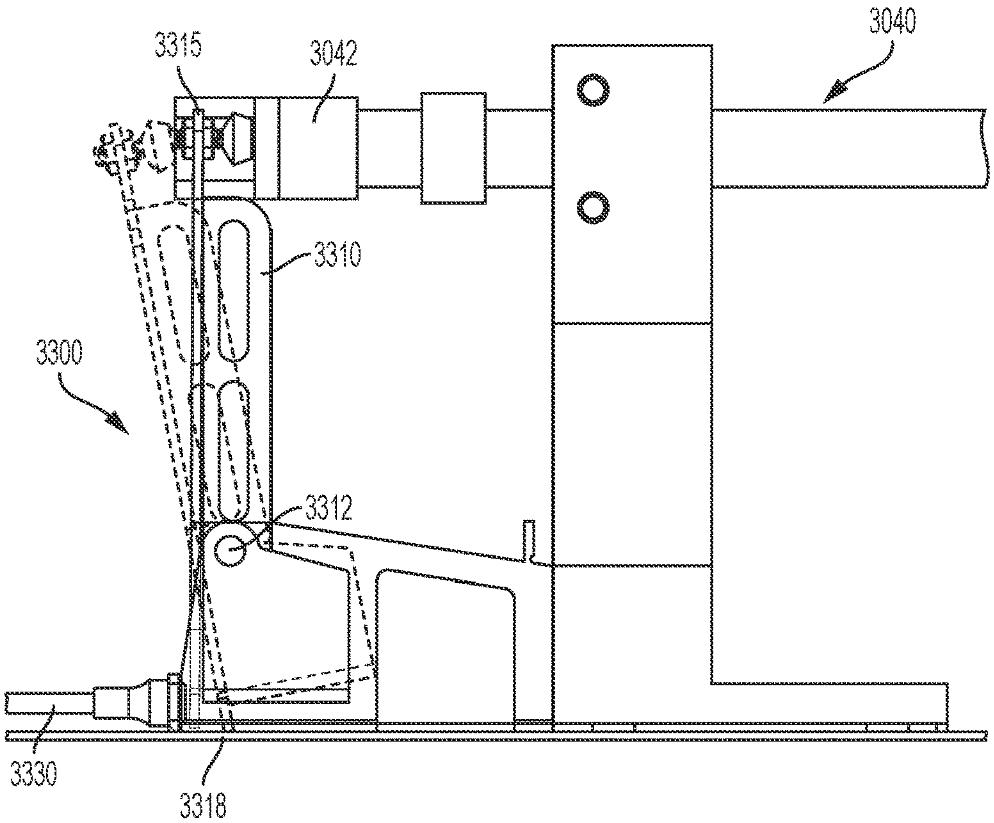
FIG. 19 is a side view of a lever mechanism for the alternative embodiment of a side rail and center latch for the present gurney restraint system.
Figure 20:
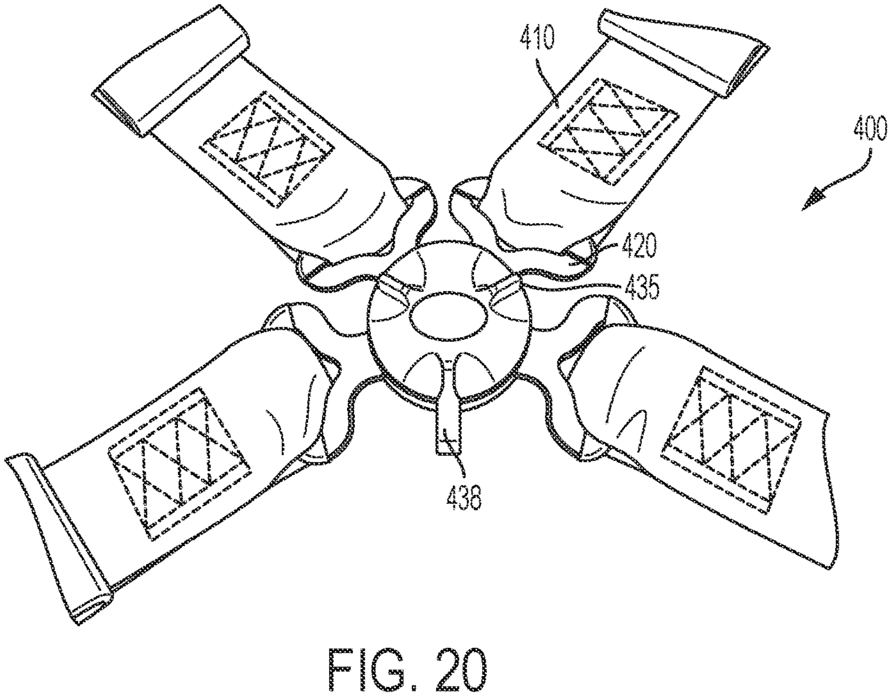
FIG. 20 is a perspective view of a four-point harness or occupant restraint for the gurney of the present gurney restraint system.

In another alternative embodiment pictured in FIGS. 18-19, the side latch 3040 is interconnected to the center latch 3200 by means of a interconnection assembly 3300 so that a single push release movement generated by the side latch handle 3046 simultaneously decouples the side latch 3040 from the fastener post (not shown) and the center latch pin (not shown) from the center latch 3200. In such an embodiment, the release member 130 and push linkage assembly 160 may be omitted from the system. The interconnection assembly 3300 comprises an actuating lever 3310 with a top end 3315 disposed near the front-most jaw 3042. When the side latch handle 3046 is pushed forward to the unlatched, position, the jaw 3042 pushes against the top end 3315 of the lever 3310. The actuating lever 3310 pivots centrally about axis 3312 so that when the jaw 3042 pushes against the upper end 3315 of the lever 3310, the lower end 3318 moves in the opposite direction and pulls a first end of an attached rigid arm or cable 3330. The other end of the rigid arm or cable 3330 may be connected directly to the second link 280 (for example, to the release arm 296 or release post 298), or indirectly to the second link 280 through a system of levers (not shown), to cause the second link 180 to rotate in a clockwise direction and release the center latch pin 240 from the center latch 240. The pivot assembly 3330 may be mass-balanced so that gravitational forces from a crash event in any direction will not inadvertently cause an unintended release. The net result of forces acting on the actuating lever 3310 must remain neutral in all situations. When actuating means other than the side latch are being used and mass balance cannot be achieved with an actuating lever 3310 that compensates for all masses affected by gravitational loads, spring forces may be relied upon to overcome increased forces imposed by crashes. It is important to note that introduced spring forces cannot cause resistance excessive for manual operation.

Figure 21:
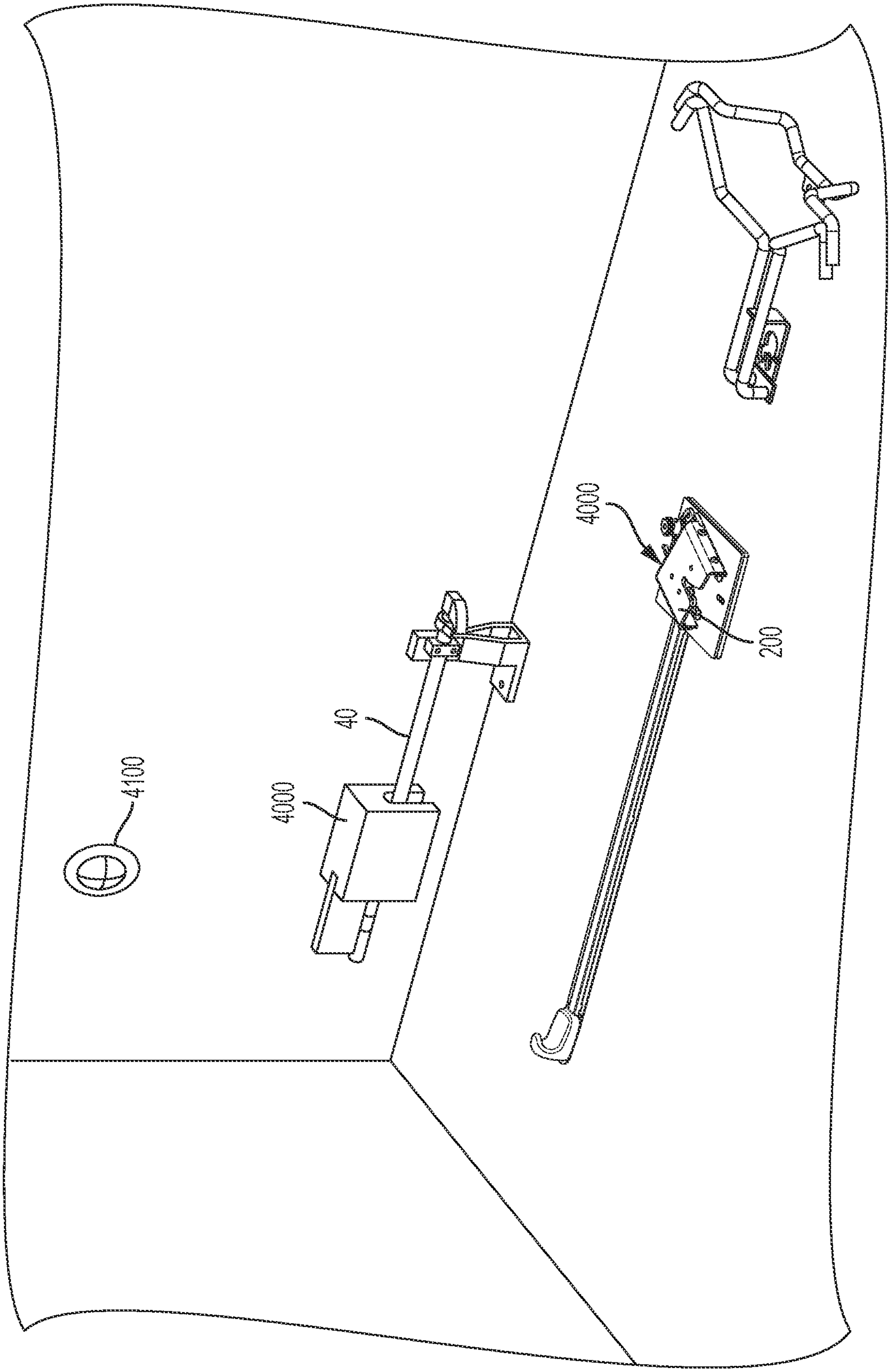
FIG. 21 is a perspective view of a second embodiment of the present gurney restraint system that includes an electronic release system.
Figure 22:
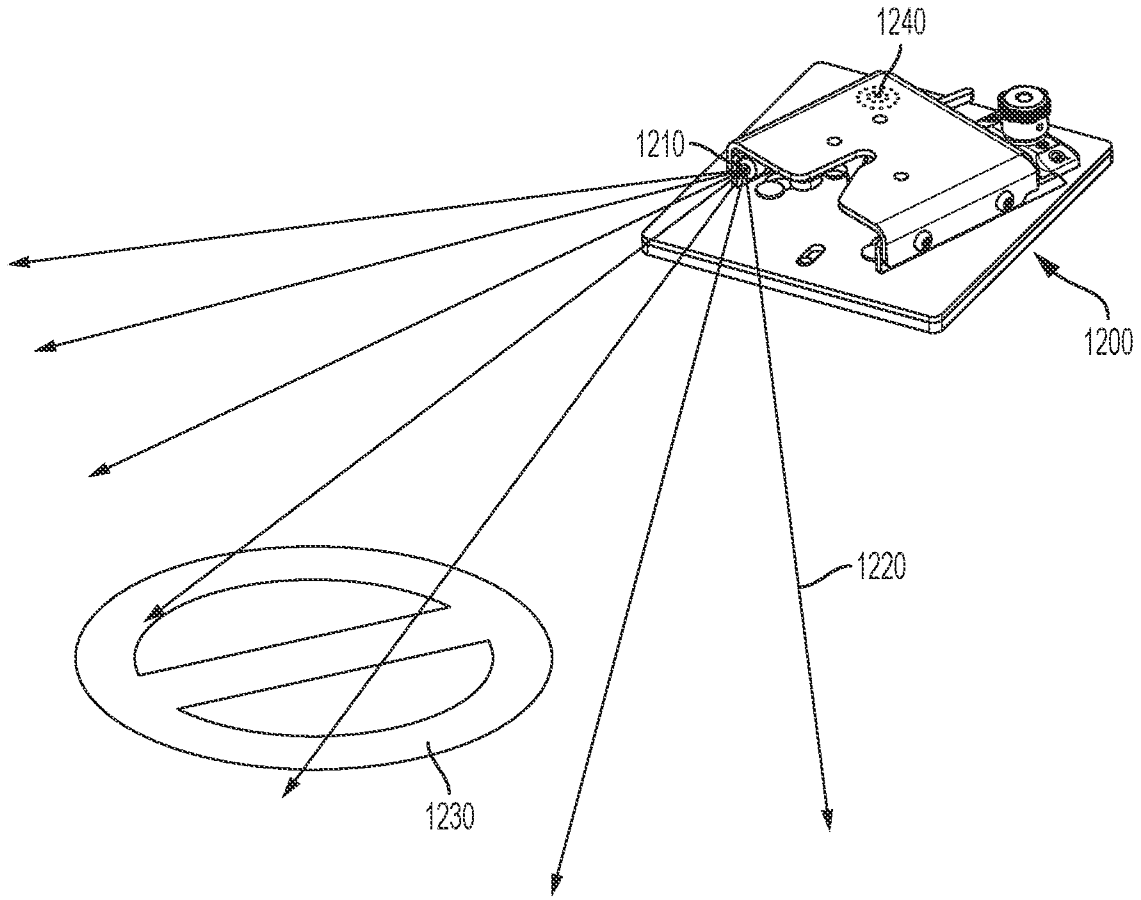
FIG. 22 is a perspective view of an alternative embodiment of the center latch for the present gurney restraint system that includes visual or auditory indicia of the locking state of the restraint system.
Figure 23:
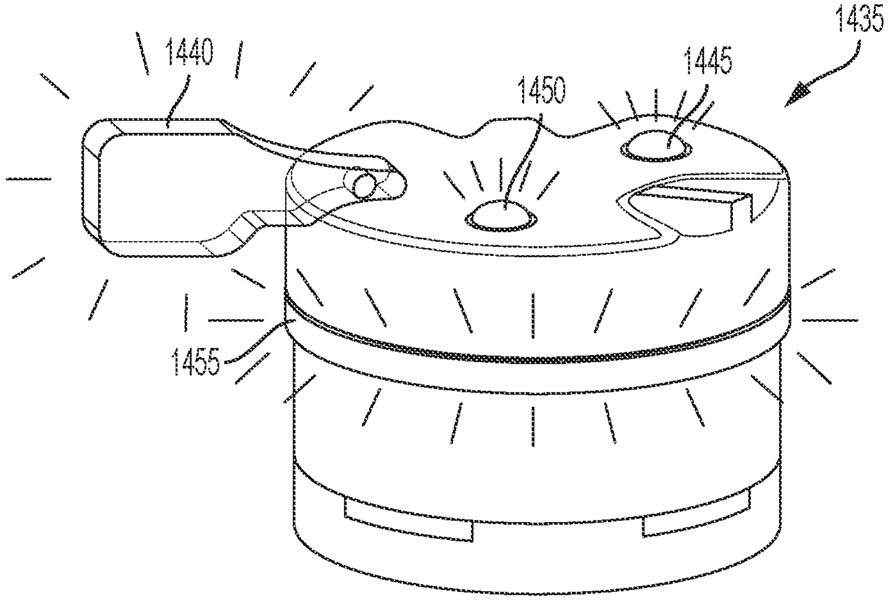
FIG. 23 is a perspective view of an alternative embodiment of the occupant harness that includes visual indicia of the locking state of the restraint system and/or the occupant restraint.

In another embodiment shown in FIG. 21, the center latch 200 and side latch 40 can alternatively be actuated by an electrically linked release mechanism that is remotely operated. In such an embodiment, the center latch 200 and side latch 40 would each be equipped with an electrical contact device 4000, such as a solenoid, that completes a release circuit when activated. More particularly, when activated, the release circuit of the center latch 200 would move the first link 260 to its open position and the release circuit of the side latch 40 would move the jaw 42 to its open position. The release circuits could be activated (i.e., triggered) by opening the ambulance patient bay doors or by a switch or remote device 4100 operated by the EMT.

To secure the patient to the gurney 10, the system can further comprise an improved 4-point cross-strap system 400, illustrated FIG. 19. The cross-strap system 400 comprises four belts sections 410 stemming from anchor point disposed on the bottom side of the gurney 10. As discussed above, preferably, the anchor point is the support bracket 28 for the latch pin 240, whereby occupant loads will bypass the gurney frame. Each belt 410 has a male connector 420 at its end that engages with a central buckle 430. Each male connector 420 can be inserted into a corresponding female connector 435 of the buckle to trigger a latch mechanism that fixes the male connector 420 to the female connector 435. The central latch-buckle 430 has a release lever 438 that can be rotated to release each latch mechanism in sequence, rather than simultaneously. This toggle function allows for the release of one male connector 420 at a time. Further, it prevents dangerous compression forces inadvertently being transmitted to the patient, which can occur with prior art buckles where the release function is triggered by the depressing a button.

The restraint system can be integrated with an electrical monitoring system. The monitoring system is formed by a series of electrical wires and contacts distributed through vital components in the gurney restraint system. The electrical system is wired to a series of status indicator lights to provide the information about the status of these components. In such an embodiment, the center latch 200 and/or side latch 40 and/or loading end restraint 30 and/or buckle 430 may be equipped with an electrical contact which signals the indicator lights when the respective latch is locked and/or released. Additional electrical contact switches may also placed within the system in a manner that signals release of the gurney restraints and the occupant restraint belts. The status indicator lights can use colors or illuminated texts or symbols to convey the locked or released status of the gurney. Audible tones can also be generated by the system to convey the locked or released status of the gurney. As one example, shown in FIG. 22, an alternative embodiment of the center latch 1200 can be provided with a laser or light projector 1210 that illuminate surfaces of the vehicle, such as the floor, with a light pattern 1220 or various symbols 1230 that will indicate one or both a safe/secured and unsafe/unsecured condition. The center latch 1200 of FIG. 22 can also be provided with a speaker 1240 that provides auditory notice of one or both a safe/secured and unsafe/unsecured condition. In alternative embodiments, the laser or light projector and speaker can be provided in or on another component of the vehicle or gurney restraint system. As yet another example, shown in FIG. 23, the buckle 1435 can be provided with one or more LED or other light emitting sources 1440, 1445, 1450, 1455 that provide visual notice of one or both a safe/secured and unsafe/unsecured condition.

Although the inventions described and claimed herein have been described in considerable detail with reference to certain embodiments, one skilled in the art will appreciate that the inventions described and claimed herein can be practiced by other than those embodiments, which have been presented for purposes of illustration and not of limitation. Therefore, the spirit and scope of the appended claims should not be limited to the description of the embodiments contained herein.

We claim:

1. A restraint system for securing a wheeled mobility device in a vehicle, the restraint system comprising a first restraint for engaging with a first end of the wheeled mobility device and a second restraint for engaging with a center region of the wheeled mobility device, wherein the second restraint comprises a first latch member and a second latch member, the first latch member being configured for connecting to the vehicle and to be hand releasable therefrom and the second latch member configured for connection to the wheeled mobility device.

2. The restraint system of claim 1, wherein the first restraint is configured to receive a wheel of the wheeled mobility device.

3. The restraint system of claim 2, wherein the first restraint comprises a hook portion for receiving the wheel.

4. The restraint system of claim 1, further comprising a release member for the second restraint, the release member being configured for connecting to the vehicle and to be hand releasable therefrom.

5. The restraint system of claim 4, further comprising a linking member, a first end of the linking member for engagement with the first latch member and a second end of the linking member for engagement with the release member, whereby the linking member is configured to manipulate the first latch member between a locked condition and an unlocked condition based on a movement of the release member.

6. The restraint system of claim 4, further comprising a first mount member for the first latch member and a second mount member for the release member, whereby the first latch member is hand releasable from the first mount member and the release member is hand releasable from the second mount member.

7. The restraint system of claim 4, wherein the first mount member and the second mount member are configured for non-hand releasable connection to the vehicle.

8. The restraint system of claim 4 further comprising a first set of mounting details for connecting the first latch member to the first mount member and a second set of mounting details for connecting the release member to the second mount member, wherein: the first set of mounting details comprises a headed stud disposed on one of the first latch member and the first mount member and a slot disposed on an other one of the first latch member and the first mount member; and the second set of mounting details comprises a headed stud disposed on one of the release member and the second mount member and a slot disposed on an other one of the release member and the second mount member.

9. The restraint system of claim 1 further comprising a set of mounting details for connecting the first latch member to the vehicle, wherein the set of mounting details comprises a headed stud and a slot; the slot is configured to receive and engage the headed stud; the first latch member is coupled to one of the headed stud and the slot.

10. The restraint system of claim 9, wherein the first latch member is coupled to the headed stud.

11. The restraint system of claim 10, wherein the slot is configured to be coupled to a floor of the vehicle.

12. The restraint system of claim 11, wherein the slot is disposed on a mounting plate configured to be coupled to the floor of the vehicle.

13. The restraint system of claim 11, further comprising a spring loaded locking pin adapted to be received in a bore, wherein the spring loaded locking pin is disposed on the first latch member and the bore is configured to be coupled to the floor of the vehicle.

14. A restraint system for securing a wheeled mobility device in a vehicle, the vehicle comprising an interior with a floor, the restraint system comprising a restraint for engaging with the wheeled mobility device, wherein the restraint comprises a first latch member, a second latch member, and a set of mounting details configured to form a hand releasable connection between the first latch member and the vehicle; the set of mounting details comprises a headed stud and a slot; the slot is configured to receive and engage the headed stud; and the first latch member is connected to one of the headed stud and the slot.

15. The restraint system of claim 14, wherein the first latch member is connected to the headed stud.

16. The restraint system of claim 15, further comprising a spring loaded locking pin adapted to be received in a bore wherein the spring loaded locking pin is disposed on the first latch member.

17. The restraint system of claim 16, wherein the slot and the bore are configured to be coupled to the floor.

18. The restraint system of claim 17, wherein the slot and the bore are disposed on a mounting plate configured to be coupled to the floor of the vehicle.

19. A vehicle having a wheeled mobility device securement area with a center region surrounded by a first end, a second end, a first side, and a second side, the vehicle comprising at least one restraint for engaging with the wheeled mobility device to secure the wheeled mobility device in the wheeled mobility device securement area and at least one set of mounting details configured to form a hand releasable connection between the at least one restraint and the vehicle, wherein: the at least one restraint comprises at least a first restraint having a first latch member configured to be coupled to the vehicle and a second latch member configured to be coupled to the wheeled mobility device; the at least one set of mounting details comprises a first set of mounting details having a headed stud coupled to the first latch member and a slot coupled to the vehicle; the first latch member includes a spring loaded locking pin engageable with a bore coupled to the vehicle to lock the headed stud in the slot.

20. The vehicle of claim 19, wherein the at least one restraint further comprises a second restraint adapted to receive a wheel of the wheeled mobility device and the at least one set of mounting details comprises a second set of mounting details having a headed stud coupled to the second restraint and a slot coupled to the vehicle.

* * * * *